(12) United States Patent
Morgan, Jr.

(10) Patent No.: US 8,182,235 B2
(45) Date of Patent: May 22, 2012

(54) MULTI-DRIVE FLUID PUMP

(75) Inventor: Christopher Carleton Morgan, Jr., Plymouth, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 768 days.

(21) Appl. No.: 12/277,764

(22) Filed: Nov. 25, 2008

(65) Prior Publication Data
US 2010/0130327 A1    May 27, 2010

(51) Int. Cl.
*F04B 17/03* (2006.01)
*F16H 61/28* (2006.01)

(52) U.S. Cl. ............ 417/16; 417/374; 418/171

(58) Field of Classification Search ............... 417/317, 417/354; 418/171
See application file for complete search history.

(56) References Cited

U.S. PATENT DOCUMENTS

| | | | |
|---|---|---|---|
| 4,400,143 | A | 8/1983 | O'Connor |
| 5,145,329 | A | 9/1992 | Zumbusch et al. |
| 6,750,557 | B2 | 6/2004 | Poteet et al. |
| 6,835,160 | B2 | 12/2004 | Kitano et al. |
| 6,840,889 | B2 | 1/2005 | Aoki et al. |
| 7,357,105 | B2 | 4/2008 | Moriwaki et al. |
| 2005/0116473 | A1 | 6/2005 | Poteet et al. |
| 2006/0054445 | A1 | 3/2006 | Pashnik et al. |
| 2007/0077153 | A1 | 4/2007 | Austen et al. |
| 2007/0186573 | A1 | 8/2007 | Ziehr et al. |

*Primary Examiner* — Tracie Y Green
(74) *Attorney, Agent, or Firm* — Dinsmore & Shohl LLP

(57) ABSTRACT

A multi-drive pump may include a pump housing, an inlet port, an outlet port, a primary pump gear, a secondary pump gear, a first internal mechanical drive mechanism coupled to the primary pump gear and a second internal mechanical drive mechanism and an internal electro-magnetic drive mechanism coupled to the secondary pump gear. The pump housing may define an internal volume fluidly coupled to the inlet port and the outlet port. The primary pump gear and the secondary pump gear may be positioned in the pump housing and coupled to one another. Rotation of the primary pump gear and the secondary pump gear draws fluid into the inlet port and expels fluid from the outlet port. The primary pump gear may be rotated by the first internal mechanical drive mechanism and the secondary pump gear may be rotated by the second internal mechanical drive mechanism and the internal electro-magnetic drive mechanism.

20 Claims, 3 Drawing Sheets

MULTI-DRIVE FLUID PUMP

TECHNICAL FIELD

The present invention generally relates to fluid pumps and, more specifically, to fluid pumps for vehicles with an internal electro-magnetic drive mechanism and multiple mechanical drive mechanisms.

BACKGROUND

Vehicles commonly contain a variety of pumps, such as a water pump, fuel pump and transmission fluid pump, for providing fluid to various vehicle components and systems. Such pumps are generally mechanically driven or electrically driven. For example, the transmission fluid pump may be coupled to the transmission of the vehicle and operable to supply fluid to the transmission to power vehicle clutches as well as to provide lubrication and cooling to transmission systems. Transmission pumps such as this are generally mechanically driven with the engine of the vehicle. However, in gas/electric hybrid vehicles, the engine of the vehicle may be periodically turned off during operation of the vehicle in order to conserve fuel, such as when the vehicle is traveling at slow speeds or when the vehicle is stopped. Under such conditions, the transmission fluid pump is not powered by the engine and, instead, a separate electric pump may be used to deliver transmission fluid to the transmission system. When the engine is restarted, the transmission fluid pump driven by the engine may require several seconds to reach appropriate operating pressures and thus both the electrical pump and the mechanical pump may run simultaneously which consumes both fuel and battery power.

Further, in some situations, it may be necessary to supply transmission fluid to the transmission system when neither the electrical system nor the engine of the vehicle is running. Such situations may arise when the vehicle is being towed, such as when a passenger vehicle is being towed behind a recreational vehicle. When the vehicle is being towed in this manner the wheels of the vehicle are driving the transmission through the driveshaft(s). However, no transmission fluid is being delivered to the transmission of the vehicle as the transmission fluid pump is not powered which may result in damage to the transmission.

Accordingly, a need exists for fluid pumps with multiple alternative electrical and mechanical drive sources.

SUMMARY

In one embodiment, a multi-drive pump includes a pump housing, an inlet port, an outlet port, a primary pump gear, a secondary pump gear, a first internal mechanical drive mechanism coupled to the primary pump gear, a second internal mechanical drive mechanism coupled to the secondary pump gear and an internal electro-magnetic drive mechanism also coupled to the secondary pump gear. The pump housing may define an internal volume fluidly coupled to the inlet port and the outlet port. The primary pump gear and the secondary pump gear may be positioned in the internal volume of the pump housing and the primary pump gear may be coupled to the secondary pump gear such that rotation of either of the primary pump gear or the secondary pump gear causes the relative rotation of the other. The rotation of the primary pump gear and the secondary pump gear may be operable to draw fluid from the inlet port and expel the fluid through the outlet port. The primary pump gear may be operable to be rotated by the first internal mechanical drive mechanism and the secondary pump gear may be operable to be rotated by both the second internal mechanical drive mechanism and the internal electro-magnetic drive mechanism.

In another embodiment, a transmission fluid pump for a vehicle includes a pump housing, an inlet port, an outlet port, a primary pump gear, a secondary pump gear, a pump drive shaft, a magnetic ring, a ring of electric coils, a drive ring and a controller. The pump housing generally defines an internal volume and the internal volume may be fluidly coupled to the inlet port and the outlet port. The primary pump gear and the secondary pump gear may be positioned in the internal volume of the pump housing and the primary pump gear may be coupled to the secondary pump gear such that rotation of either of the primary pump gear or the secondary pump gear causes the relative rotation of the other, wherein, when the primary pump gear and the secondary pump gear are rotated, fluid may be drawn into the inlet port and expelled from the outlet port.

The primary pump gear may be positioned on the pump drive shaft and an inner clutch may be disposed between the pump drive shaft and the primary pump gear such that the primary pump gear is coupled to the pump drive shaft only when the pump drive shaft is rotated in one direction thereby rotating the primary pump gear with the pump drive shaft. The pump drive shaft may be operable to impart the rotational motion of a first external drive source to the primary pump gear.

The magnetic ring may be attached to and extend circumferentially around the secondary pump gear. The ring of electric coils may be disposed in a coil housing and operable to rotate with respect to the pump housing. The ring of electric coils may extend circumferentially around the magnetic ring and may be spaced apart from the magnetic ring. When the electric coils are energized, the ring of electric coils and the magnetic ring may cause the secondary pump gear to rotate. The controller may be electrically coupled to the ring of electric coils and operable to energize the coils and control the speed of rotation of the secondary pump gear.

The drive ring may extend circumferentially around the coil housing and may be operable to rotate with respect to the pump housing. An outer clutch may be disposed between the drive ring and the coil housing such that the drive ring is coupled to the coil housing only when the drive ring is rotated in one direction. The drive ring may be operable to impart the rotational motion of a second external drive source to the secondary pump gear.

In yet another embodiment, a system for providing transmission fluid to a transmission of a vehicle includes an engine, a torque converter coupled to the engine, a transmission coupled to the torque converter, an axle coupled to the transmission and a multi-drive pump. The multi-drive pump may include a pump housing, an inlet port, an outlet port, a primary pump gear, a secondary pump gear, a first internal mechanical drive mechanism, a second internal mechanical drive mechanism and an internal electro-magnetic drive mechanism.

The pump housing defines an internal volume. The inlet port fluidly couples the internal volume to a transmission fluid reservoir and the outlet port fluidly couples the internal volume to the transmission. The primary pump gear and the secondary pump gear may be positioned in the internal volume of the pump housing and the primary pump gear may be coupled to the secondary pump gear such that rotation of either of the primary pump gear or the secondary pump gear causes the relative rotation of the other and the rotation of the primary pump gear and the secondary pump gear may be operable to draw fluid from the transmission fluid reservoir into the internal volume and expel the transmission fluid from the internal volume into the transmission. The first internal mechanical drive mechanism may be coupled to the primary pump gear and the torque converter and operable to impart a rotation of the torque converter to the primary pump gear. The second internal mechanical drive mechanism may be coupled to the secondary pump gear and the axle and operable to impart a rotation of the axle to the secondary pump gear. The internal electro-mechanical drive mechanism may be coupled to the secondary pump gear and operable to rotate the secondary pump gear.

These and additional features provided by the embodiments of the present invention will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

Figure 1:
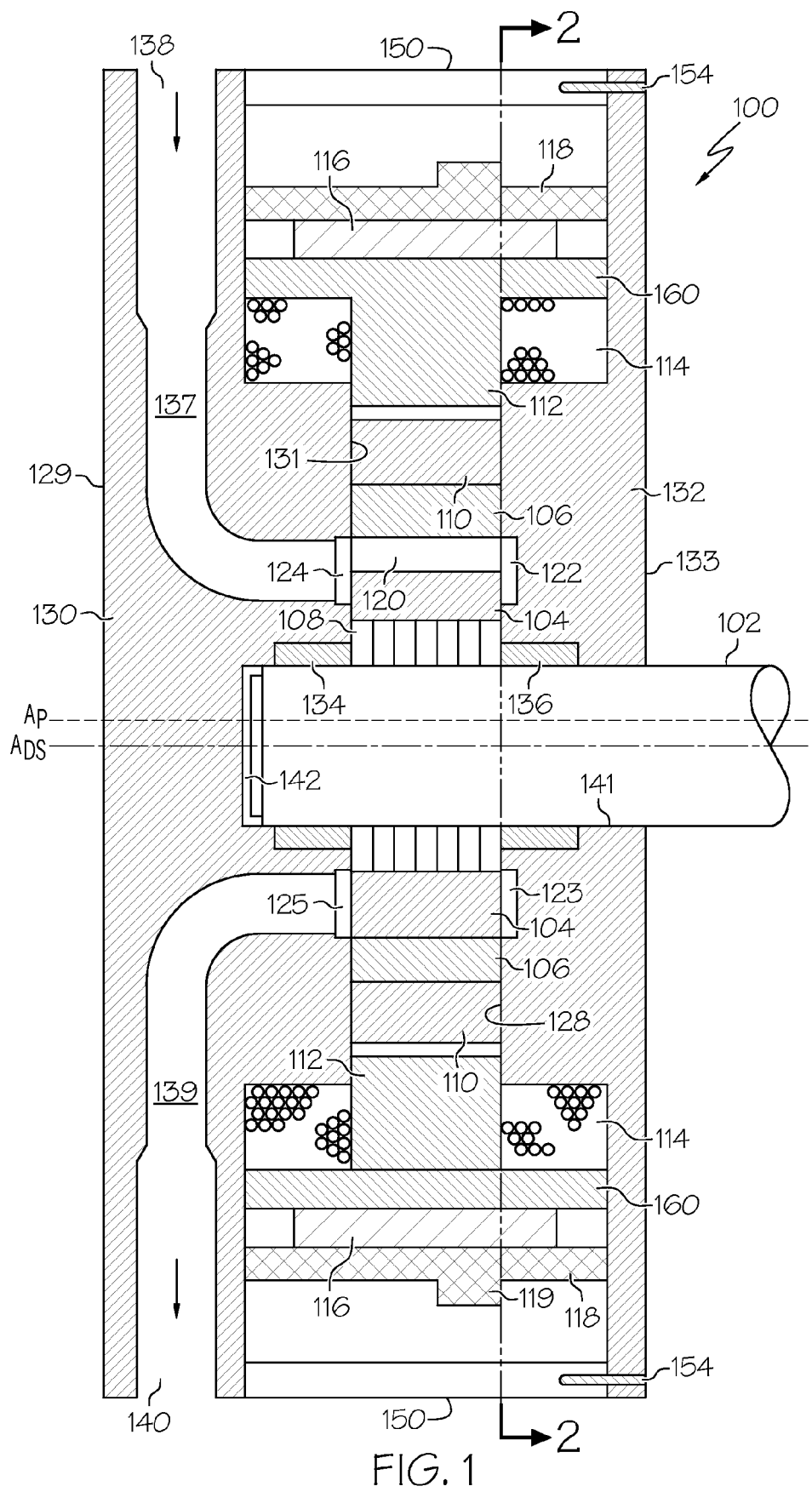
FIG. 1 depicts a longitudinal cross section of a multi-drive fluid pump according to one or more embodiments shown and described herein.

As shown in FIG. 1, a multi-drive fluid pump may generally comprise an inlet port, an outlet port, a primary pump gear, a secondary pump gear, a pump drive shaft, a drive ring, a plurality of electric coils, a magnetic ring and at least two clutches disposed in a housing. The multi-drive fluid pump may be driven with an electrical power source or with one of two mechanical power sources. The various components of the multi-drive fluid pump and methods of operating the multi-drive fluid pump will be described in more detail herein.

Figure 2:
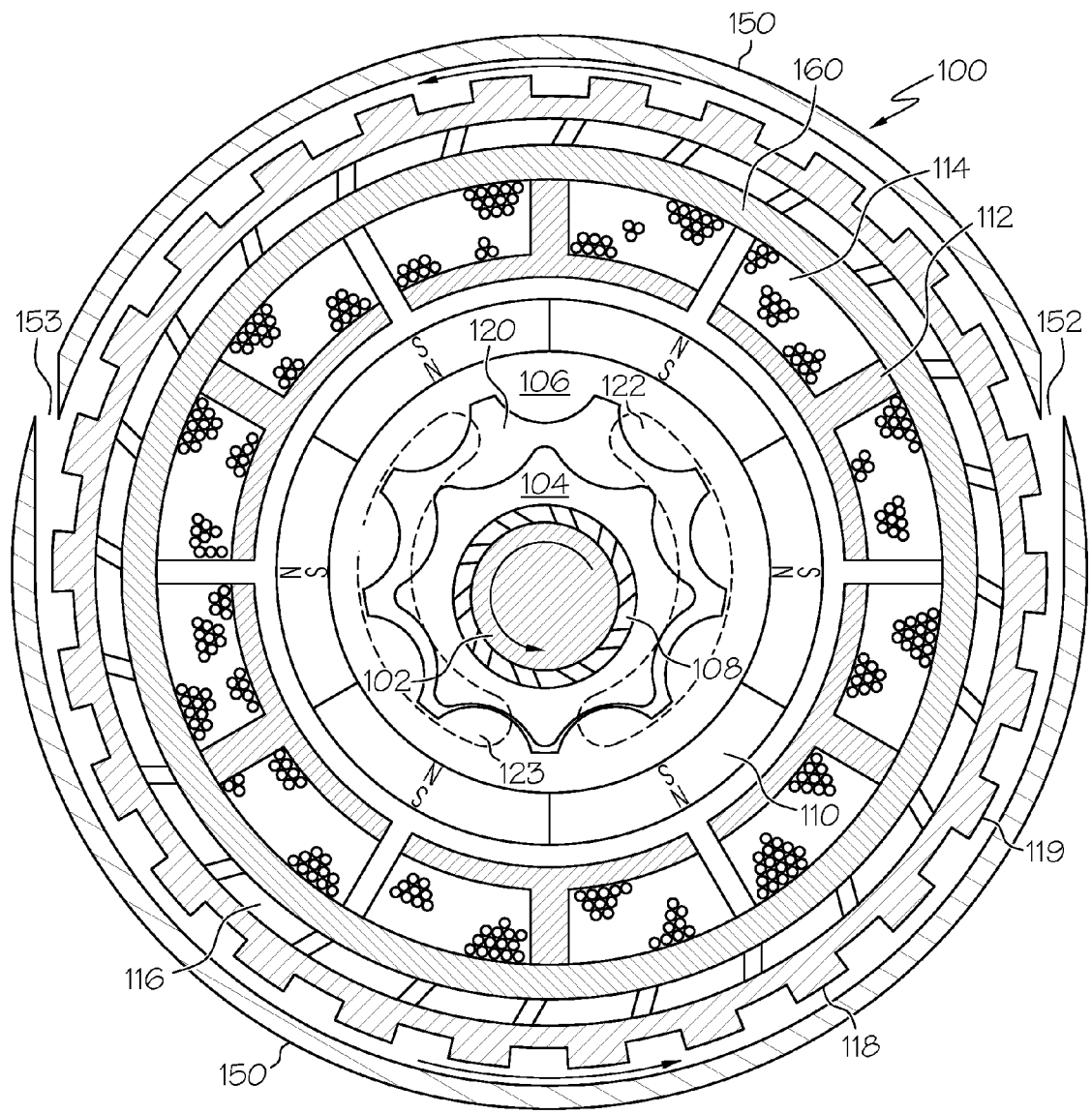
FIG. 2 depicts a radial cross section of the multi-drive fluid pump of FIG. 1 according to one or more embodiments shown and described herein.

Referring to FIGS. 1 and 2, the multi-drive pump 100 may generally comprise an inlet port 138, an outlet port 140, a primary pump gear 104, a secondary pump gear 106, a pump drive shaft 102, a drive ring 118, an electric motor comprising a plurality of electric coils 114 and a magnetic ring 110, an inner clutch 108 and an outer clutch 116 disposed in a pump housing 150. The pump housing 150 may be cylindrical in shape and generally defines an interior volume 120. The pump housing 150 may contain slots 152, 153 or similar openings that permit a belt or chain to pass through the pump housing 150 and engage the gear teeth 119 of the drive ring 118 and thereby impart rotational motion to the drive ring 118, as will be discussed in more detail herein. Except as noted herein, the axis of rotation of the various rotating components of the multi-drive fluid pump 100 are generally coaxial with or parallel to the axis of rotation $A_P$ of the pump housing 150.

The pump housing 150 may be enclosed by end covers 130, 132 which may be fastened to the pump housing 150 with bolts 154, screws or other suitable fasteners. In one embodiment, end cover 130 may comprise an exterior surface 129 and an interior surface 131 such that, when the end cover 130 is positioned in the pump housing 150, the interior surface 131 of end cover 130 is located directly adjacent the interior volume 120 of the multi-drive pump 100. The interior surface 131 may comprise a blind bore 142 formed with or machined into the end cover 130 and operable to receive a pump drive shaft 102, as described further herein. In one embodiment, the blind bore 142 is not coaxial with the rotational axis $A_P$ of the end cover 130 and the pump. Instead, the blind bore 142 is offset from the rotational axis of the end cover 130 and pump housing 150 such that, when the pump drive shaft 102 is positioned in the blind bore 142, the axis of rotation ADS of the pump drive shaft 102 is offset from the rotational axis of the end cover and pump, as shown in FIG. 1. The end cover 130 may comprise a bearing 134 for supporting and facilitating the rotation of the pump drive shaft 102 when the pump drive shaft is positioned in the blind bore 142.

The interior surface 131 of the end cover 130 may comprise a pair of recessed pockets 124, 125 formed with or machined into the interior surface 131 of the end cover 130. In one embodiment, the pockets 124, 125 may be semi-circular slots extending in an arc around the blind bore 142. The pockets 124, 125 directly face and are open to the interior volume 120 of the multi-drive pump 100.

The end cover 130 may also comprise an inlet port 138 for receiving fluid from a fluid source (not shown) and an outlet port 140 for delivering fluid to a component or system such as, for example, the transmission of a vehicle. A channel 137 fluidly couples the inlet port 138 to the pocket 124 and, in turn, to the interior volume 120 of the multi-drive pump 100 while channel 139 fluidly couples the outlet port 140 to the pocket 125 and, in turn, the interior volume 120 of the multi-drive pump 100.

End cover 132 may comprise an interior surface 128 and an exterior surface 133 such that, when the end cover 132 is positioned in the pump housing 150, the interior surface of the end cover 132 is directly adjacent the interior volume 120 of the multi-drive pump 100. The end cover 132 may comprise a bore 141 extending through the end cover 132 such that a pump drive shaft 102 may be positioned in the end cover 132. End cover 132 may also comprise a bearing 136 for supporting and facilitating the rotation of the pump drive shaft 102 with respect to the end cover 132. The bore 141 is generally aligned with the blind bore 142 of the end cover 130 such that, bore 141 and blind bore 142 together with bearings 134 and 136 support the pump drive shaft 102 in the pump housing 150 and facilitate the rotation of the pump drive shaft 102 with respect to the pump housing 150.

As describe herein with respect to end cover 130, end cover 132 may also comprise a pair of recessed pockets 122, 123 formed with or machined into the interior surface 128 of the end cover 132. In one embodiment, the pockets 122, 123 (shown in FIG. 2) may be semi-circular slots extending in an arc around the bore 141. The pockets 122, 123 are opposed to and substantially aligned with pockets 124, 125 of end cover 130 on opposite ends of the pump housing 150. The pockets 122, 123 directly face and are open to the interior volume 120 of the multi-drive pump 100.

The pumping action of the multi-drive pump 100 may be facilitated by a primary pump gear 104 disposed within a secondary pump gear 106. In one embodiment, the primary pump gear 104 and the secondary pump gear 106 may generally comprise a pair of complimentary gerotor gears, as shown in FIGS. 1 and 2. For example, the primary pump gear 104 may be a gerotor star gear while the secondary pump gear 106 may be a gerotor ring, as depicted in FIG. 2. The primary pump gear 104 comprises a plurality of lobes or teeth extending radially outward from the primary pump gear 104 while the secondary pump gear 106 comprises a plurality of complimentary lobes or teeth extending radially inward from the secondary pump gear 106 such that the primary pump gear 104 and the secondary pump gear 106 may be mechanically mated during rotation. Accordingly, rotation of one of the primary pump gear 104 or secondary pump gear 106 facilitates rotation of the other. The axes of rotation of the respective primary and secondary pump gears 104, 106 are generally parallel (e.g., non-coaxial). More specifically, in the embodiment shown in FIG. 2 the axis of rotation of the primary pump gear 104 is eccentric with respect to the axis of rotation of the secondary pump gear 106.

In another embodiment (not shown), the primary pump gear and the secondary pump gear may comprise a pair of intermeshed spur gears such that rotation of one spur gear (e.g., the primary pump gear or the secondary pump gear) rotates the other spur gear.

Referring again to FIGS. 1 and 2, the primary pump gear 104 and the secondary pump gear 106 are disposed in the pump housing 150 and are free to rotate with respect to the pump housing 150 and the end cover 130, 132. For example, the primary pump gear 104 and the secondary pump gear 106 are positioned in the interior volume 120 of the pump housing 150 between the end cover 130 and 132 such that, as the pump gears rotate (as will be described in further detail herein), the pump gears 104, 106 separate between opposed pockets 124 and 122 (e.g., separation of the intermeshed pump gears 104, 106 occurs proximate the pocket 124 fluidly coupled to the inlet port 138) and the pump gears 104, 106 intermesh between opposed pockets 125 and 123 (e.g., intermeshing of the pump gears 104, 106 intermesh proximate the pocket 125 fluidly coupled to the outlet port 140).

In operation, the primary pump gear 104 may be rotated thereby imparting rotation to the secondary pump gear 106 through the intermeshing of the respective teeth or lobes. Alternatively, the secondary pump gear 106 may be rotated thereby imparting rotation to the primary pump gear 104. As the pump gears 104, 106 separate during rotation, the increase in the volume or space between the pump gears 104, 106 creates a low pressure area or vacuum between the respective gears 104, 106. As noted above, the separation of the gears occurs proximate the pocket 124 fluidly coupled to the inlet port 138 such that the vacuum draws fluid from a fluid source (not shown) fluidly coupled to the inlet port 138 through the channel 137 and into opposed pockets 124, 122 and the interior volume 120 of the multi-drive fluid pump 100. As the pump gears 104, 106 intermesh, the volume between the pump gears 104, 106 decreases and any fluid disposed between the pump gears 104, 106 is compressed. Furthermore, as the pump gears 104, 106 rotate past the pocket 125 fluidly coupled to the outlet port 140, the fluid between the pump gears 104, 106, now compressed, is expelled out of the interior volume 120 of the multi-drive pump 100 through the channel 139 and out of the outlet port 140. Accordingly, by rotating one of the pump gears 104, 106, fluid may be drawn into the multi-drive fluid pump and expelled from the multi-drive fluid pump at increased pressure.

To facilitate rotation of the pump gears 104, 106 and thereby operation of the multi-drive pump 100, the multi-drive pump 100 may be operable to rotate the pump gears relative to the pump housing 150 using a plurality of alternate drive mechanisms. For example, the multi-drive pump 100 may comprise an internal electro-magnetic drive mechanism and two separate internal mechanical drive mechanisms. The internal mechanical drive mechanisms may be configured for connection to external drive sources. Each of these drive mechanisms will now be described in more detail with specific reference to FIGS. 1 and 2.

To facilitate operation of the multi-drive pump 100 from a first internal mechanical drive mechanism, the primary pump gear 104 may be disposed on a pump drive shaft 102 such that the primary pump gear 104 may rotate with or on the pump drive shaft 102. The pump drive shaft 102 is rotationally mounted in the blind bore 142 in the end cover 130 and extends axially through the opposing end cover 132 as described above. The pump drive shaft 102 may be supported by bearings 134, 136 disposed in the end covers 130, 132 respectively such that the pump drive shaft 102 is free to rotate with respect to the end covers 130, 132 and the pump housing 150.

The primary pump gear 104 is mechanically coupled to the pump drive shaft 102 with an inner clutch 108 disposed between the pump drive shaft 102 and the primary pump gear 104. The inner clutch 108 may comprise a one-way clutch, such as a sprag clutch, a roller ramp clutch, a magneto-rheologic fluid clutch, a mechanical diode or similar clutch, such that the primary pump gear 104 is only mechanically coupled to the pump drive shaft 102 when the shaft is rotated in a specific direction. In the embodiment shown in FIGS. 1 and 2 the inner clutch 108 is a sprag clutch and the primary pump gear 104 is mechanically coupled to the pump drive shaft 102 when the pump drive shaft 102 is rotating counter-clockwise. Accordingly, when the pump drive shaft 102 is rotated in a counter-clockwise direction, the primary pump gear 104 is also rotated in a counter-clockwise direction thereby rotating the secondary pump gear 106 and facilitating operation of the multi-drive fluid pump 100. As such, the pump drive shaft 102 and inner clutch 108 form a first mechanical drive mechanism of the pump 100.

In one embodiment, when the multi-drive pump 100 is used to supply fluid to a component or system of a vehicle, such as the transmission of a vehicle, the portion of the pump drive shaft 102 extending outside the multi-drive pump 100 may be mechanically coupled to the torque converter of the vehicle such that the rotation of the torque converter is imparted to the pump drive shaft 102 thereby powering the multi-drive pump 100. However, it should be understood that the pump drive shaft 102 may be mechanically coupled to any external drive source suitable for imparting rotational motion to the pump drive shaft 102.

As noted herein, the multi-drive fluid pump 100 may also comprise an internal electro-magnetic drive mechanism to facilitate operation of the pump. In one embodiment, to facilitate driving the multi-drive fluid pump electro-magnetically, the secondary pump gear 106 may comprise a magnetic ring 110 extending circumferentially around and attached to the secondary pump gear 106, as shown in FIGS. 1 and 2. The magnetic ring 110 may comprise a plurality of circumferentially arranged permanent magnets, as depicted in FIG. 2. The permanent magnets may be arranged in the magnetic ring 110 such that the poles of each magnet lie in a radial direction. The magnets may also be arranged such that the pole orientation of each magnet is different than the pole orientation of each adjacent magnet (e.g., one magnet may have a N/S orientation while the magnets on either side have a S/N orientation in a radial direction). The secondary pump gear 106 and attached magnetic ring 110 may be spaced apart from a ring of electric coils 114 disposed in the internal volume 120 of the pump housing 150 and extending circumferentially around the magnetic ring 110. The magnetic ring 110 and attached secondary pump gear 106 may be operable to rotate relative to the electric coils 114 and the pump housing 150.

Electric coils 114 may be formed from electrical conductors (e.g., wires) wound on coil cores or pole pieces 112 in a coil housing 160. The pole pieces 112 extend radially inward from the coil housing 160. In one embodiment, the pole pieces 112 are integrally formed with the coil housing 160, as shown in FIG. 2. In another embodiment, the pole pieces 112 are affixed to the coil housing 160 by welding, bonding, adhesives or the like. The coil housing 160 and pole pieces may be formed from steel or another suitable ferrous material. The pole pieces 112 may be circumferentially spaced to establish large flux gaps between adjacent pole pieces 112 and thereby enable electrical conductors to be wound around the pole pieces 112 to form the electric coils 114. Individual coils 114 are interconnected with leads (not shown) and connected to a current/voltage source (not shown) with similar leads (not shown). The coil housing 160 and attached pole pieces 112 and electric coils 114 may be disposed in the pump housing 150 such that the coil housing 160 may be rotated with respect to the pump housing 150.

When the electric coils 114 are energized (e.g., when electric current is supplied to the coils from the current/voltage source), the coils produce an electromagnetic field which interacts with the magnetic field of the permanent magnets in the magnetic ring 110 thereby causing the rotation of the secondary pump gear 106 and the corresponding rotation of the primary pump gear 104. Accordingly, the electric coils 114 and magnetic ring 110 form the internal electro-magnetic drive mechanism of the multi-drive fluid pump 100. The current/voltage source (not shown) may include a drive circuit or similar logic circuit or programmable logic controller for controlling the current and/or voltage provided to the electric coils 114 and thereby controlling the speed of rotation of the secondary pump gear 106 and the operation of the multi-drive pump 100. For example, in one embodiment, the magnitude and frequency of the current and/or voltage supplied to the electric coils 114 may be adjusted to increase or decrease the speed of rotation of the secondary pump gear 106 with respect to the pump housing 150. In other embodiments, the current and/or voltage supplied to the electric coils 114 may be adjusted such that the electric coils 114 may be used as an electro-magnetic clutch with respect to the magnetic ring 110. For example, the electric coils 114 may be energized such that the electro-magnetic field produced by the electric coils 114 couples the magnetic ring 110 and attached secondary pump gear 106 to the electric coils 114 such that the secondary pump gear 106 may only be rotated in conjunction with the rotation electric coils 114 and the corresponding coil housing 160.

In another embodiment (not shown), the electro-magnetic drive mechanism may comprise a two electric coils. For example, instead of a magnetic ring 110, the multi-drive fluid pump may include an internal electric coil (not shown). The internal electric coil may be of a similar configuration as the electric coil 114 such that, when the internal electric coil and the electric coil are energized, the secondary pump gear 106 may be rotated in conjunction with the rotation of the electric coils 114 and the corresponding coil housing 160. Accordingly, it should be understood that the electro-magnetic drive mechanism may comprise the electric coil 114 in conjunction with the magnetic ring 110 or the electric coils 114 in conjunction with an internal electric coil.

To facilitate operation of the multi-drive pump 100 from a second mechanical drive source, the secondary pump gear 106 may be mechanically coupled to a drive ring 118. The drive ring 118 extends circumferentially around the coil housing 160 and comprises a plurality of gear teeth 119 extending radially from the drive ring 118 such that the drive ring 118 may be mechanically coupled to a belt or chain (not shown) for imparting rotational motion to the drive ring 118. The drive ring 118 may be mechanically coupled to the coil housing 160 with an outer clutch 116 disposed between the drive ring 118 and the coil housing 160. The outer clutch 116 may comprise a one-way clutch, such as a sprag clutch, a roller ramp clutch, a magneto-rheologic fluid clutch, a mechanical diode or similar clutch, such that the secondary pump gear 106 is only mechanically coupled to the coil housing 160 when the secondary pump gear 106 is rotated in a specific direction. In the embodiment shown in FIGS. 1 and 2, the outer clutch 116 comprises a sprag clutch and the drive ring 118 is mechanically coupled to the coil housing 160 when the drive ring 118 is rotating counter-clockwise. Thus, the drive ring 118 and outer clutch 116 form a second internal mechanical drive mechanism.

In order to drive the multi-drive pump 100 from the drive ring 118, the coil housing 160, including the electric coils 114 and the pole pieces 112 must be coupled to magnetic ring 110 such that, when the coil housing 160 is rotated with the drive ring 118, the rotational motion is imparted to the magnetic ring 110 and, in turn, to the secondary pump gear 106 and the primary pump gear 104. In one embodiment, the electric coils 114 may be used as an electromagnetic clutch to electromagnetically couple the electric coils 114 to the magnetic ring 110, as described hereinabove. In another embodiment (not shown), the multi-drive pump 100 may comprise an intermediate clutch disposed between the electric coils 114 and the magnetic ring 110 such that, when the coil housing 160 is rotated, the magnetic ring 110 and attached secondary pump gear 106 are also rotated which, in turn, rotates the primary pump gear 104. The intermediate clutch may comprise a one-way clutch, such as a sprag clutch, a roller ramp clutch, a magneto-rheologic fluid clutch, a mechanical diode or similar clutch, such that the magnetic ring 110 is only mechanically coupled to the coil housing 160 when the coil housing 160 is rotated in a specific direction.

As described herein, the drive ring 118 may be rotated using a belt or chain (not shown) which mechanically couples the drive ring 118 to a rotating shaft or other external drive source suitable for imparting rotation to the drive ring 118 and thereby powering the multi-drive fluid pump 100. The belt or chain may extend through the slots 152, 153 in the pump housing 150 and mechanically engage the gear teeth 119 of the drive ring 118. In one embodiment, when the multi-drive pump 100 is used to supply fluid to a component or system of a vehicle, such as the transmission of a vehicle, the belt or chain may mechanically couple the drive ring 118 to an axle of the vehicle such that, when the axle is rotated, the rotational motion of the axle is imparted to the drive ring 118 which, in turn, drives the pump thereby pumping transmission fluid to the transmission of the vehicle.

In another embodiment (not shown), the drive ring 118 may be directly attached to, or integral with, the coil housing 160. In this embodiment, the secondary pump gear 106 and primary pump gear 104 may be isolated from the rotational motion of the drive ring 118 by using the electric coils 114 and magnetic ring 110 as a clutch. More specifically, the electric coils 114 may be energized such that the electric coils may be coupled to the magnetic ring 110 such that rotation of the drive ring 118 may be imparted to the secondary pump gear 106 and, in turn, to the primary pump gear 104.

While FIGS. 1 and 2 show the primary pump gear 104 and the secondary pump gear 106 as comprising a pair of intermeshed gerotor gears, it should be understood that gears of various other configurations may be used. For example, in one embodiment (not shown), the primary pump gear 104 and the secondary pump gear 106 may comprise a pair of intermeshed spur gears, or similar pump gears, such that the rotation of the one pump gear causes the rotation of the other pump gear thereby creating the pump action of the multi-drive fluid pump. One spur gear (e.g., the primary pump gear) may be coupled to the drive shaft 102, as described hereinabove. The other spur gear (e.g., the secondary pump gear) may be positioned on and rotatable with a second shaft which is parallel to the pump drive shaft 102. The second shaft may be mechanically coupled to or integral with the magnetic ring 110 such that the second shaft was coaxial with the magnetic ring 110. The electric coils 110, drive ring 118, and outer clutch 116 may be disposed around the magnetic ring 110 as described herein with respect to FIGS. 1 and 2. The basic operation of the pump using spur gears instead of gerotor gears is the same as described with respect to FIGS. 1 and 2.

Figure 3:
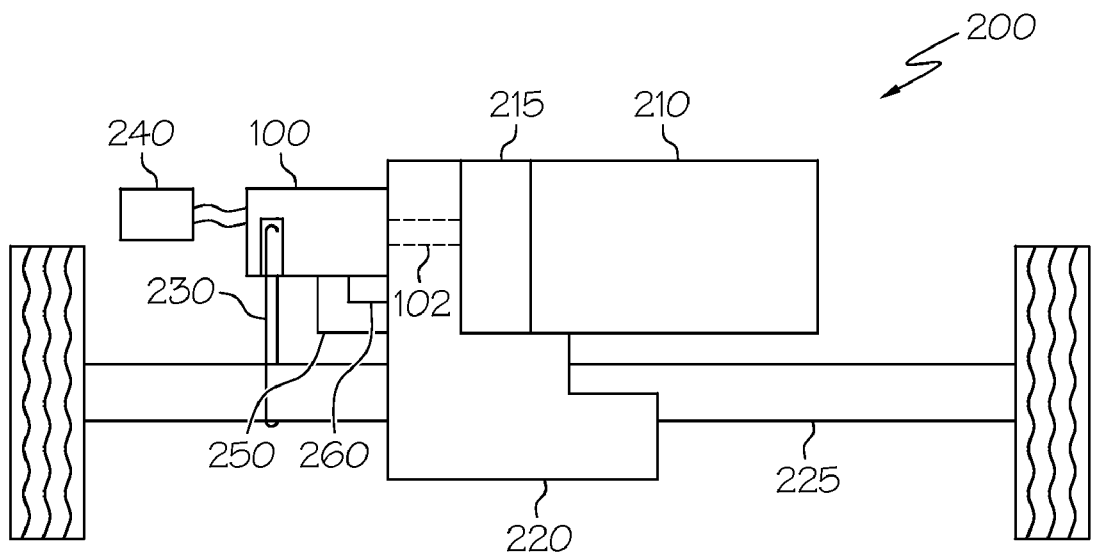
FIG. 3 depicts a multi-drive fluid pump fluidly coupled to the transmission of a vehicle and mechanically coupled to multiple mechanical drive sources.
Figure 3:
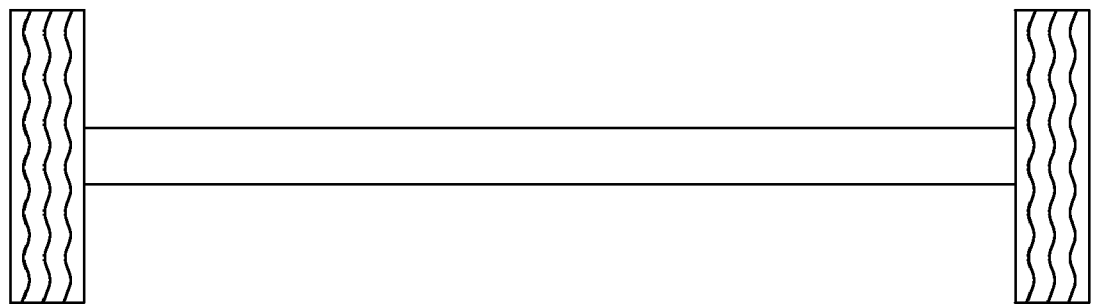

Referring now to FIG. 3, a multi-drive pump 100 is schematically illustrated in use in conjunction with a vehicle 200. The vehicle 200 is a front-wheel drive vehicle comprising an engine 210, a torque converter 215 coupled to the engine and a transmission 220 coupled to the torque converter. The input port and output port of the multi-drive fluid pump 100 may be fluidly coupled to the transmission 220 of the vehicle 200 with conduits 250, 260 such that transmission fluid may be pumped from a transmission fluid reservoir (not shown) and back into the transmission 220. The multi-drive fluid pump 100 is also electrically coupled to a controller 240 which provides power to the electric coils of the multi-drive pump 100 and regulates the current and/or voltage supplied to the multi-drive pump 100. The drive shaft 102 of the multi-drive pump 100 is operatively coupled to the torque converter 215 such that the rotational motion of the torque converter 215 may be imparted to the pump drive shaft 102 of the multi-drive pump 100 in one mode of operation of the multi-drive pump 100. In one embodiment, the drive shaft 102 is coupled directly to the torque converter 215. In another embodiment, the torque converter 215 may be coupled to the pump drive shaft 102 with one or more clutches (not shown) which facilitate engaging and disengaging the pump drive shaft 102 with the torque converter 215 according to the specific mode of operation of the vehicle and/or pump, as will be discussed further herein. The multi-drive pump 100, specifically the drive ring (not shown) of the multi-drive pump 100, is operatively attached to the axle 225 of the vehicle 200 with belts (and/or chains) 230, as shown in FIG. 3. In one embodiment (not shown), a gear box may be disposed between the drive ring of the multi-drive pump 100 and the axle 225 of the vehicle. The gear box may contain one or more clutches such that the rotational motion of the axle 225 may be selectively imparted to the drive ring of the multi-drive pump. In the embodiment of the vehicle 200 shown in FIG. 3, it should be understood that the controller 240 and torque converter 215 may also be coupled to a transmission electronic control unit (ECU) operable to selectively engage a specific external drive source (e.g., the controller, the torque converter and/or the axle) with the corresponding pump drive mechanism.

The multi-drive pump 100 shown in FIGS. 1-3 may be operated in a plurality of different modes. For example the multi-drive fluid pump 100 may be driven from the pump drive shaft 102, the internal electro-magnetic drive source, the drive ring 118 or both the pump drive shaft 102 and the internal electro-magnetic drive source in conjunction with one another. Each mode of operation will now be described in more detail with reference to FIGS. 1-3.

Referring now to FIGS. 1-3, in one mode of operation, the multi-drive pump 100 may be powered by a single internal mechanical drive mechanism, specifically the pump drive shaft 102 alone. In this mode of operation the torque converter 215 is engaged with the pump drive shaft 102 and the rotational motion of the torque converter 215 is imparted to the pump drive shaft 102 rotating the pump drive shaft 102 in a counter-clockwise direction. As the pump drive shaft 102 rotates counter-clockwise, the inner clutch 108 mechanically couples the pump drive shaft 102 to the primary pump gear 104 which, in turn, intermeshes with and rotates the secondary pump gear 106 thereby drawing fluid into the multi-drive pump 100 via the inlet port 138 and expelling the fluid out of the multi-drive pump 100 via the outlet port 140. In this mode of operation, the drive ring 118 and coil housing 160 do not contribute to the operation of the multi-drive pump 100. More specifically, in this mode of operation, the electric coils 114 are not energized and the belt (or chain) 230 and, as such, the primary pump gear 104 and secondary pump gear 106 are free to rotate independently of the drive ring 118.

The pump drive shaft 102 may be used to power the multi-drive pump 100 when the engine of the vehicle is on and powering the torque converter 215. For example, when the vehicle 200 is a gas/electric hybrid vehicle, the engine of the vehicle may be switched off at low speeds or at traffic lights. Under these conditions the pump drive shaft 102 would not be used to power the multi-drive pump 100. However, any time the combustion engine of the vehicle 200 is on, the pump drive shaft 102 may be used to power the multi-drive pump 100.

In another mode of operation, the multi-drive fluid pump 100 may be electrically powered using the internal electro-magnetic power source (e.g., the electric coils 114 in conjunction with the magnetic ring 110). In this mode of operation the primary pump gear 104 may be disengaged from the pump drive shaft 102 such that the primary pump gear 104 is free to rotate relative to the pump housing 150 and pump drive shaft 102 and the coil housing 160 is disengaged from the drive ring 118 by outer clutch 116 such that the rotational motion of the axle 225 is not imparted to the coil housing 160. The controller 240 supplies the electric coils 114 with controlled current and/or voltage signals thereby causing the secondary pump gear 106 to rotate relative to the pump housing in a counter-clockwise direction based on the interaction between the electro-magnetic field generated by the electric coils 114 and the magnetic field of the magnetic ring 110. Rotation of the secondary pump gear 106 causes the primary pump gear 104 to rotate in a counter-clockwise direction thereby drawing fluid into the multi-drive pump 100 via the inlet port 138 and expelling the fluid out of the multi-drive pump 100 via the outlet port 140.

The pump may be driven by the internal electro-magnetic drive mechanism when the engine 210 of the vehicle is off but the electrical system of the vehicle remains energized. For example, when the vehicle 200 is a gas/electric hybrid, the engine may be shut off during low speed driving or when the vehicle comes to a stop. Under these conditions the vehicle may be powered electrically. In order to continue the flow of transmission fluid to the transmission, the multi-drive pump 100 may be electrically driven thereby providing transmission fluid to the transmission.

In another mode of operation, the multi-drive fluid pump 100 may be driven from another internal mechanical drive mechanism, specifically the drive ring 118. In this mode of operation the pump drive shaft 102 may be disengaged from the torque converter 215 of the vehicle 200 with inner clutch 108 such that the pump drive shaft 102 is free to rotate relative to the pump housing 150. As discussed above, the drive ring 118 is mechanically coupled to the axle 225 with belt and/or chain 230 such that the rotation of the axle 225 is imparted to the drive ring 118, rotating the drive ring 118 in a counter-clockwise direction and, in turn, rotating the coil housing 160. In this mode of operation, the coil housing 160 may be mechanically coupled to the magnetic ring 110 by energizing the coils 114 to create an electromagnetic clutch (as discussed above) or with an intermediate one-way clutch (as discussed above). The rotation of the coil housing is thus imparted to the secondary pump gear 106 and the primary pump gear 104 causing both to rotate in a counter-clockwise direction thereby drawing fluid into the multi-drive pump 100 via the inlet port 138 and expelling the fluid out of the multi-drive pump 100 via the outlet port 140.

The multi-drive pump 100 may be driven from the drive ring 100 when the engine of the vehicle is shut off but the wheels of the vehicle are driving the transmission thus requiring that transmission fluid be provided to the transmission. This condition may exist when the vehicle 200 is being towed, such as when the vehicle 200 is being dinghy towed behind a recreational vehicle or another vehicle. In this embodiment, power may be supplied to the electromagnetic clutch by the tow harness, a generator coupled to the wheels of the vehicle, or by powering the electrical system of the vehicle with the battery (e.g., the key of the vehicle is switched "on" but the engine of the vehicle is not started).

In yet another mode of operation, the multi-drive fluid pump 100 may be driven by both the internal electromagnetic drive mechanism and an internal mechanical drive mechanism. For example, the pump drive shaft 102 and the internal electro-magnetic drive source (e.g., the electric coils 114 and the magnetic ring 110) may be used in conjunction with one another in order to maintain the speed of the multi-drive pump 100 and the corresponding fluid pressure created by the pump. In this mode of operation, the pump drive shaft 102 may be engaged with the torque converter 215 of the vehicle 200 such that the pump drive shaft 102 rotates the primary pump gear 104 in a counter-clockwise direction thereby driving the multi-drive pump 100 such that transmission fluid is drawn into the inlet port 138 and expelled out of the outlet port 140 and into the transmission. A pressure sensor (not shown) operable to measure the pressure of transmission fluid supplied to the transmission 220 may be disposed in the transmission 220 or the conduit 260 connecting the outlet port 140 of the multi-drive fluid pump 100 to the transmission. The pressure sensor may be electrically coupled to the transmission ECU (not shown). When the pressure of the transmission fluid supplied to the transmission 220 drops below a predetermined level for the current speed of the vehicle 200, the transmission ECU may activate the internal electro-magnetic drive source of the multi-drive pump 100 via controller 240 thereby energizing the electric coils 114 and driving the secondary pump gear 106 electro-magnetically. The current and/or voltage supplied to the electric coils 114 may be sufficient to increase the speed of rotation of the secondary pump gear 106 and primary pump gear 104 such that the pressure of transmission fluid supplied to the pump is increased above a threshold pressure for the current speed of the vehicle.

The multi-drive pump 100 may be used in this mode of operation when the engine 210 of the vehicle 200 is switched on and the vehicle 200 is in motion but the engine 210 is not driving the wheels of the vehicle and, as such, the speed of the torque converter 215 is decreasing. For example, this condition may be present when the vehicle 200 is descending a hill and the speed of the vehicle is being maintained without depressing the engine accelerator.

It should now be understood that the multi-drive fluid pump shown and described herein may comprise an internal electro-magnetic drive mechanism and two internal mechanical drive mechanisms. It should also be understood that the multi-drive fluid pump may be used in multiple modes of operation. For example, the multi-drive fluid pump may be driven using a single drive mechanism independent of the other drive mechanisms or by using a combination of the internal electro-magnetic drive mechanism in conjunction with one mechanical drive mechanism.

The multi-drive fluid pump shown and described herein is particularly well suited for use in conjunction with vehicles, including gas/hybrid electric vehicles, as the multiple drive mechanisms of the multi-drive fluid pump facilitate operating the engine of the vehicle in a fuel efficient manner. While specific reference has been made herein to using the multi-drive pump as a transmission fluid pump for a vehicle, it should be understood that the multi-drive fluid pump may also be used as a water pump, a fuel pump or any other fluid pump that may be incorporated in a vehicle. Moreover, while specific reference has been made herein to using the multi-drive fluid pump in conjunction with vehicles, it should be understood that the multi-drive fluid pump may be used in other applications requiring fluid pumping such as, for example, marine applications, industrial equipment and the like.

For purposes of describing and defining the present invention it is noted that the terms "substantially" and "about" are utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments and aspects of the present invention have been illustrated and described herein, various other changes and modifications can be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A multi-drive fluid pump comprising a pump housing, an inlet port, an outlet port, a primary pump gear, a secondary pump gear, a first internal mechanical drive mechanism coupled to the primary pump gear, a second internal mechanical drive mechanism coupled to the secondary pump gear and an internal electro-magnetic drive mechanism also coupled to the secondary pump gear, wherein:

the pump housing defines an internal volume fluidly coupled to the inlet port and the outlet port;

the primary pump gear and the secondary pump gear are positioned in the internal volume of the pump housing such that rotation of either of the primary pump gear or the secondary pump gear causes relative rotation of the other, wherein the rotation of the primary pump gear and the secondary pump gear is operable to draw fluid into the inlet port and expel the fluid from the outlet port;

the primary pump gear is operable to be rotated by the first internal mechanical drive mechanism; and the secondary pump gear is operable to be rotated by both the second internal mechanical drive mechanism and the internal electro-magnetic drive mechanism.

2. The multi-drive fluid pump of claim 1 wherein the first mechanical drive mechanism comprises a pump drive shaft and an inner clutch disposed between the primary pump gear and the pump drive shaft, wherein:

the primary pump gear extends circumferentially around the pump drive shaft and is mechanically coupled to the pump drive shaft only when the pump drive shaft is rotated in one direction; and the pump drive shaft is operable to impart rotational motion of an external drive source to the primary pump gear.

3. The multi-drive fluid pump of claim 1 wherein the internal electro-magnetic drive mechanism comprises a magnetic ring and a ring of electric coils, wherein:

the magnetic ring is attached to the secondary pump gear; and the ring of electric coils is spaced apart from the magnetic ring and extends circumferentially around the magnetic ring, wherein, when the electric coils are energized, the ring of electric coils and the magnetic ring cause the secondary pump gear to rotate.

4. The multi-drive fluid pump of claim 1 wherein the second internal mechanical drive mechanism comprises a drive ring and an outer clutch, wherein:

the drive ring extends around the secondary pump gear and the outer clutch is disposed between the secondary pump gear and the drive ring such that the secondary pump gear is mechanically coupled to the drive ring only when the drive ring is rotated in one direction; and the drive ring is operable to impart the rotational motion of a second external drive source to the secondary pump gear.

5. The multi-drive fluid pump of claim 4 further comprising an intermediate clutch disposed between the drive ring and the secondary pump gear, wherein:

the internal electro-magnetic drive mechanism is disposed between the outer clutch and the secondary pump gear such that the drive ring is directly coupled to the internal electro-mechanical drive mechanism with the outer clutch and is thereby rotated with the drive ring; and the intermediate clutch couples the electro-magnetic drive mechanism to the secondary pump gear when the drive ring is rotated such that rotation of the drive ring is imparted to the secondary pump gear.

6. The multi-drive pump of claim 4 wherein the internal electro-magnetic drive mechanism is disposed between the outer clutch and the secondary pump gear and the drive ring is directly coupled to the internal electro-magnetic drive mechanism with the outer clutch when the outer drive gear is rotated thereby rotating the internal electro-magnetic drive mechanism with the drive ring; and the internal electro-magnetic drive mechanism is coupled to the secondary pump gear such that rotation of the drive ring is imparted to both the internal electro-magnetic drive mechanism and the secondary pump gear.

7. A transmission fluid pump for a vehicle comprising a pump housing, an inlet port, an outlet port, a primary pump gear, a secondary pump gear, a pump drive shaft, a magnetic ring, a ring of electric coils, a drive ring and a controller, wherein:

the pump housing defines an internal volume fluidly coupled to the inlet port and the outlet port;

the primary pump gear and the secondary pump gear are positioned in the internal volume of the pump housing and the primary pump gear is coupled to the secondary pump gear such that rotation of either of the primary pump gear or the secondary pump gear causes relative rotation of the other, wherein, when the primary pump gear and the secondary pump gear are rotated, fluid is drawn into the inlet port and expelled from the outlet port;

the primary pump gear is positioned on the pump drive shaft with a clutch disposed between the pump drive shaft and the primary pump gear such that the primary pump gear is coupled to the pump drive shaft only when the pump drive shaft is rotated in one direction thereby rotating the primary pump gear with the pump drive shaft and the pump drive shaft is operable to impart rotational motion of a first external drive source to the primary pump gear;

the magnetic ring is attached to the secondary pump gear;

the ring of electric coils is disposed in a coil housing operable to rotate with respect to the pump housing, the ring of electric coils extending circumferentially around and spaced apart from the magnetic ring, wherein, when the electric coils are energized, the ring of electric coils and the magnetic ring cause the secondary pump gear to rotate;

the controller is electrically coupled to the ring of electric coils and operable to energize the coils and control a speed of rotation of the secondary pump gear; and the drive ring extends circumferentially around the coil housing and is operable to rotate with respect to the pump housing, wherein an outer clutch is disposed between the drive ring and the coil housing such that the drive ring is coupled to the coil housing only when the drive ring is rotated in one direction and the drive ring is operable to impart the rotational motion of a second external drive source to the secondary pump gear.

8. The transmission fluid pump of claim 7 further comprising an intermediate clutch disposed between the ring of electric coils and the magnetic ring such that, when the drive ring is rotated, the intermediate clutch couples the ring of electric coils to the magnetic ring and rotation of the drive ring is imparted to the secondary pump gear.

9. The transmission fluid pump of claim 7 wherein the controller is operable to energize the ring of electric coils such that the ring of electric coils is coupled to the magnetic ring when the drive ring is rotated thereby imparting the rotation of the drive ring to the secondary pump gear.

10. The transmission fluid pump of claim 7 wherein the first external drive source is a torque converter of the vehicle.

11. The transmission fluid pump of claim 7 wherein the second external drive source is an axle of the vehicle or transmission output gear of the vehicle.

12. A system for providing transmission fluid to a transmission of a vehicle, the system comprising an engine, a torque converter coupled to the engine, a transmission coupled to the torque converter, an axle coupled to the transmission and a multi-drive pump comprising a pump housing, an inlet port, an outlet port, a primary pump gear, a secondary pump gear, a first internal mechanical drive mechanism, a second internal mechanical drive mechanism and an internal electro-magnetic drive mechanism, wherein:

the pump housing defines an internal volume and the inlet port fluidly couples the internal volume to a transmission fluid reservoir and the outlet port fluidly couples internal volume to the transmission;

the primary pump gear and the secondary pump gear are positioned in the internal volume of the pump housing and the primary pump gear is coupled to the secondary pump gear such that rotation of either of the primary pump gear or the secondary pump gear causes relative rotation of the other, wherein the rotation of the primary pump gear and the secondary pump gear is operable to draw fluid from the transmission fluid reservoir into the internal volume and expel the transmission fluid from the internal volume into the transmission;

the first internal mechanical drive mechanism is coupled to the primary pump gear and the torque converter and is operable to impart a rotation of the torque converter to the primary pump gear;

the second internal mechanical drive mechanism is coupled to the secondary pump gear and the axle and is operable to impart a rotation of the axle to the secondary pump gear; and the internal electro-mechanical drive mechanism is coupled to the secondary pump gear and is operable to rotate the secondary pump gear.

13. The system of claim 12 wherein the first mechanical drive mechanism comprises a pump drive shaft and an inner clutch disposed between the primary pump gear and the pump drive shaft, wherein the primary pump gear extends circumferentially around the pump drive shaft and is mechanically coupled to the pump drive shaft only when the pump drive shaft is rotated in one direction.

14. The system of claim 13 wherein the pump drive shaft is coupled to the torque converter with a clutch which facilitates engaging and disengaging the pump drive shaft with the torque converter.

15. The system of claim 13 wherein the internal electro-magnetic drive mechanism comprises a magnetic ring and a ring of electric coils, wherein:

the magnetic ring is attached to the secondary pump gear; and the ring of electric coils is spaced apart from the magnetic ring and extends circumferentially around the magnetic ring, wherein, when the electric coils are energized, the ring of electric coils and the magnetic ring cause the secondary pump gear to rotate.

16. The system of claim 13 wherein the second internal mechanical drive mechanism comprises a drive ring and an outer clutch, wherein the drive ring extends circumferentially around the secondary pump gear and the outer clutch is disposed between the secondary pump gear and the drive ring such that the secondary pump gear is mechanically coupled to the drive ring only when the drive ring is rotated in one direction.

17. The system of claim 16 wherein the drive ring comprises a plurality of teeth extending radially outward from the outer drive gear and the drive ring is coupled to the axle with a belt, a chain or both.

18. The system of claim 16 further comprising a gear box disposed between the drive ring and the axle, wherein the gear box is operable to selectively impart rotational motion of the axle to the drive ring.

19. The system of claim 16 further comprising an intermediate clutch disposed between the drive ring and the secondary pump gear, wherein:

the internal electro-magnetic drive mechanism is disposed between the outer clutch and the secondary pump gear such that the drive ring is directly coupled to the internal electro-mechanical drive mechanism with the outer clutch and is thereby rotated with the drive ring; and the intermediate clutch couples the electro-magnetic drive mechanism to the secondary pump gear when the drive ring is rotated such that rotation of the drive ring is imparted to the secondary pump gear.

20. The system of claim 16 wherein the internal electro-magnetic drive mechanism is disposed between the outer clutch and the secondary pump gear and the drive ring is directly coupled to the internal electro-magnetic drive mechanism with the outer clutch when the outer drive gear is rotated thereby rotating the internal electro-magnetic drive mechanism with the drive ring; and the internal electro-magnetic drive mechanism is coupled to the secondary pump gear such that rotation of the drive ring is imparted to both the internal electro-magnetic drive mechanism and the secondary pump gear.

* * * * *